(12) United States Patent
Blunier et al.

(10) Patent No.: US 9,713,299 B2
(45) Date of Patent: *Jul. 25, 2017

(54) FLUID DELIVERY SYSTEM FOR AN AGRICULTURAL IMPLEMENT

(71) Applicant: CNH Industrial America LLC, New Holland, PA (US)

(72) Inventors: Timothy R. Blunier, Danvers, IL (US); Jarod Murdock, Knoxville, IL (US)

(73) Assignee: CNH Industrial America LLC, New Holland, PA (US)

( * ) Notice: Subject to any disclaimer, the term of this patent is extended or adjusted under 35 U.S.C. 154(b) by 98 days.

This patent is subject to a terminal disclaimer.

(21) Appl. No.: 14/703,658

(22) Filed: May 4, 2015

(65) Prior Publication Data

US 2015/0230399 A1 Aug. 20, 2015

Related U.S. Application Data

(62) Division of application No. 13/605,202, filed on Sep. 6, 2012, now Pat. No. 9,021,967.

(51) Int. Cl.
*A01B 49/06* (2006.01)
*A01C 23/02* (2006.01)

(52) U.S. Cl.
CPC ............ *A01C 23/023* (2013.01); *A01B 49/06* (2013.01)

(58) Field of Classification Search
CPC ......... A01B 49/06; A01B 49/04; A01B 49/00; A01C 23/023; A01C 23/02; A01C 23/00

USPC .......... 111/118–130, 7.1–7.4, 170, 174–176, 111/186–188, 200

See application file for complete search history.

(56) References Cited

U.S. PATENT DOCUMENTS

| | | |
|---|---|---|
| 4,062,306 A | 12/1977 | Wosmek |
| 4,566,489 A | 1/1986 | Knapp et al. |
| 5,413,182 A | 5/1995 | Kromminga et al. |
| 5,706,558 A | 1/1998 | Sauer |
| 5,890,445 A | 4/1999 | Ridgley |
| 6,116,277 A | 9/2000 | Wilcox et al. |
| 7,198,060 B2 | 4/2007 | Hiser |
| 7,246,826 B2 | 7/2007 | Ignaczak et al. |
| 7,404,365 B2 | 7/2008 | McLeod |
| 7,475,919 B2 | 1/2009 | Hiernard et al. |
| 9,021,967 B2 * | 5/2015 | Blunier ................ A01C 23/025 111/118 |

(Continued)

*Primary Examiner* — Christopher J Novosad
(74) *Attorney, Agent, or Firm* — Rebecca L. Henkel; Rickard K. DeMille (57) ABSTRACT

An agricultural implement includes a first tool bar and a second tool bar each supporting respective ground engaging tools and fluid dispersal components. The second tool bar is pivotally coupled to the first tool bar. The agricultural implement further includes fluid conduits coupled to respective tool bars for conveying fluid to the respective fluid dispersal components. Additionally, each of the conduits has a flexible end adjacent to the other tool bar. Furthermore, the agricultural implement includes a fluid joint coupled between the first and second flexible ends and configured to provide a sealed connection between the first and second flexible ends during relative pivotal movement of the first and second tool bars in operation but to allow for uncoupling of the first and second flexible ends for servicing of the agricultural implement.

20 Claims, 4 Drawing Sheets

(56) References Cited

U.S. PATENT DOCUMENTS

2004/0211790 A1\* 10/2004 Werth .................. F25D 23/126
                                                        222/212

\* cited by examiner

FLUID DELIVERY SYSTEM FOR AN AGRICULTURAL IMPLEMENT

CROSS-REFERENCE TO RELATED APPLICATION

This application is a divisional application of U.S. application Ser. No. 13/605,202, filed Sep. 6, 2012, entitled "Fluid Delivery System for an Agricultural Implement", which is hereby incorporated by reference in its entirety for all purposes.

BACKGROUND

The invention relates generally to ground working equipment, such as agricultural equipment, and more specifically, to a fluid delivery system for a folding implement.

Generally, fertilizer application implements are towed behind a tractor or other work vehicle via a hitch assembly secured to a rigid frame of the implement. These fertilizer application implements typically include one or more ground engaging tools or openers that form a path for fertilizer deposition into the soil. The openers are used to break the soil, thereby enabling injection nozzles or knife (e.g., positioned behind the openers) to deposit fertilizer at a desired depth beneath the soil surface. Using such an implement, fertilizer may be distributed throughout a field, either before or after planting, to facilitate enhanced crop development.

BRIEF DESCRIPTION

In one embodiment, an agricultural implement includes a first tool bar supporting first ground engaging tools and first fluid dispersal components. The agricultural implement also includes a second tool bar supporting second ground engaging tools and second fluid disposal components, the second tool bar being pivotally coupled to the first tool bar. Additionally, the agricultural implement includes a first fluid conduit coupled to the first tool bar for conveying fluid to the second fluid dispersal components, the second fluid conduit having a second flexible end adjacent to the first tool bar. Furthermore, the agricultural implement includes a fluid joint coupled between the first and second flexible ends and configured to provide a sealed connection between the first and second flexible ends during relative pivotal movement of the first and second tool bars in operation but to allow for uncoupling of the first and second flexible ends.

In another embodiment, an agricultural implement includes a central tool bar supporting central ground engaging tools and central fluid dispersal components. The agricultural implement also includes a first wing tool bar supporting first wing ground engaging tools and first wing fluid dispersal components, the first wing tool bar being pivotally coupled to the central tool bar at a first end. The agricultural implement further includes a second wing tool bar supporting second wing ground engaging tools and second wing fluid dispersal components, the second wing tool bar being pivotally coupled to the central tool bar at a second end. Additionally, the agricultural implement includes a central fluid conduit coupled to the central tool bar for conveying fluid to the central fluid dispersal components, the central fluid conduit having a first flexible end adjacent to the first end and a second flexible end at the second end. Moreover, the agricultural implement includes a first wing fluid conduit coupled to the first wing tool bar for conveying fluid to the first wing fluid dispersal components, the first wing fluid conduit having a first wing flexible end adjacent to the first end. The agricultural implement includes a second wing fluid conduit coupled to the second wing tool bar for conveying fluid to the second wing fluid dispersal components, the second wing fluid conduit having a second wing flexible end adjacent to the second end. Furthermore, the agricultural implement includes a first fluid joint coupled between the first flexible end and the first wing flexible end, wherein the first fluid joint is configured to provide a sealed connection between the first end and the first wing flexible end during relative pivotal movement of the central and first wing tool bars in operation but to allow for uncoupling of the first flexible end and the first wing flexible end for servicing of the implement. Finally, the agricultural implement includes a second fluid joint coupled between the second flexible end and the second wing flexible end, wherein the second fluid joint is configured to provide a sealed connection between the second flexible end and the second wing flexible end during relative pivotal movement of the central and second wing tool bars in operation but to allow for uncoupling of the second flexible end and the second wing flexible end for servicing of the implement.

In a further embodiment, an agricultural implement includes a main tool bar supporting main ground engaging tools and main fluid dispersal components. The agricultural implement also includes a first wing tool bar supporting first wing ground engaging tools and first wing fluid dispersal components, the first wing tool bar being pivotally coupled to the main tool bar. The agricultural implement further includes a second wing tool bar supporting second wing ground engaging tools and second wing fluid dispersal components, the second wing tool bar being pivotally coupled to the first wing tool bar. Additionally, the agricultural implement includes a main fluid conduit coupled to the main tool bar for conveying fluid to the main fluid dispersal components, the main fluid conduit having a main flexible end adjacent to the first wing tool bar. Moreover, the agricultural implement a first wing fluid conduit coupled to the first wing tool bar for conveying fluid to the first wing fluid dispersal components, the first wing fluid conduit having a first wing flexible end adjacent to main flexible end. The agricultural implement includes a second wing fluid conduit coupled to the second wing tool bar for conveying fluid to the second wing fluid dispersal components, the second wing fluid conduit having a second wing flexible end adjacent to the first wing flexible end. The agricultural implement includes a first fluid joint coupled between the main flexible end and the first wing flexible end, wherein the first fluid joint is configured to provide a sealed connection between the main end and the first wing flexible end during relative pivotal movement of the main and first wing tool bars in operation but to allow for uncoupling of the main flexible end and the first wing flexible end for servicing of the implement. Furthermore, the agricultural implement includes a second fluid joint coupled between the first and second wing flexible ends, wherein the second fluid joint is configured to provide a sealed connection between the first and the second wing flexible ends during relative pivotal movement of the main and second wing tool bars in operation but to allow for uncoupling of the first and second wing flexible ends for servicing of the implement.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
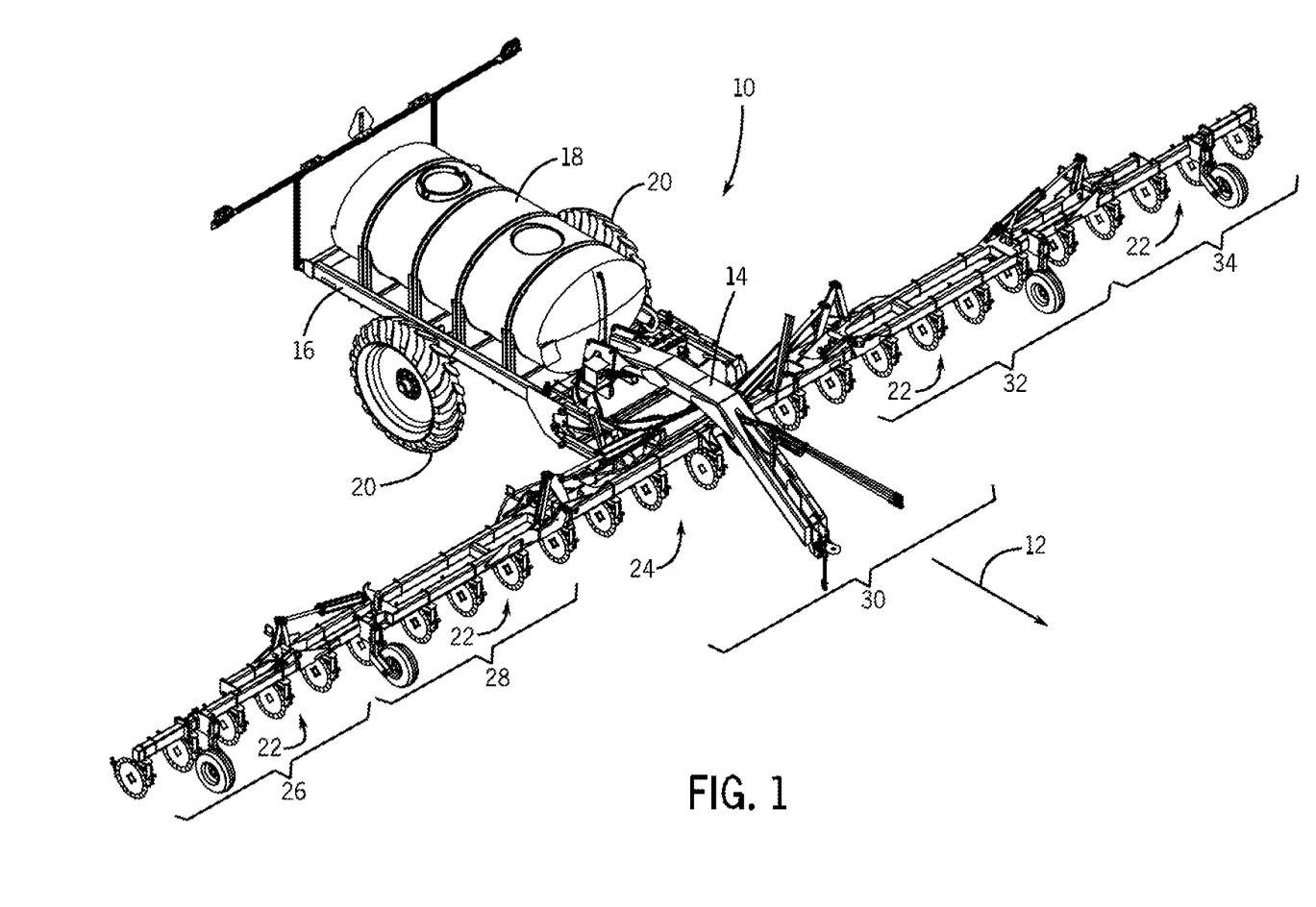
FIG. 1 is a perspective view of an embodiment of an agricultural implement having a storage tank mounted between frame rails with an associated fluid delivery system.

FIG. 1 is a perspective view of an embodiment of an agricultural implement 10 having a storage tank mounted between frame rails. In the illustrated embodiment, the implement 10 is configured to be towed along a direction of travel 12 by a work vehicle, such as a tractor or other prime mover. The work vehicle may be coupled to the implement 10 by a hitch assembly 14, such as the illustrated "goose neck" frame. As illustrated, the hitch assembly 14 is coupled to a main frame 16 of the implement 10 to facilitate towing of the implement 10 in the direction of travel 12. In the illustrated embodiment, the main frame 16 supports a storage tank 18 configured to house a flowable agricultural product, such as fluid fertilizer A pair of wheels 20 coupled to the main frame 16 is configured to support the weight of the frame 16, the storage tank 18, and the flowable agricultural product, thereby enabling the implement 10 to be towed across the field.

The implement 10 is configured to transfer the flowable agricultural product from the storage tank 18 to multiple row units 22 of a tool bar assembly 24. Each row unit 22 may include a ground engaging tool (e.g., coulter disc) configured to break the soil, thereby excavating a trench into the soil. Each row unit 22 may also include fluid dispersal components (e.g., dispersal blades and/or fluid injectors) positioned behind the ground engaging tool and configured to deposit flowable agricultural product from the storage tank 18 into the trench formed by the ground engaging tool. In certain embodiments, a penetration depth of the ground engaging tools is adjustable to facilitate deposition of the agricultural product at a desired depth beneath the soil surface. Accordingly, a flowable agricultural product, such as fluid fertilizer, may be distributed throughout a field, either before or after planting, to facilitate enhanced crop development.

While the illustrated implement 10 includes 24 row units 22, it should be appreciated that alternative implements may include more or fewer row units 22. For example, certain implements 10 include a tool bar assembly 24 having a right outer wing 26, a right inner wing 28, a central tool bar 30, a left inner wing 32, and a left outer wing 34. Additionally, certain implements may include 12, 16, 20, 24, 32, or more row units 22 distributed across the central tool bar 30 and wings 26, 28, 32, and 34. As discussed below in further detail, the number of row units and the spacing between row units may be particularly selected to correspond to the arrangement of row units on respective seeding or planting implements. For example, the implement 10 may include 25 row units 22 spaced 30 inches from one another. Accordingly, as the implement 10 is towed across a field, the row units 22 deposit fertilizer in rows having 30-inch spacing. After the fertilizer is applied, a seeding or planting implement having row units configured to deposit seeds into the soil at 30-inch spacing is aligned with the rows of fertilizer. As the seeding or planting implement moves across the field, seeds are placed into proximity with the previously applied fertilizer, thereby facilitating enhanced crop development. In addition, the implement 10 may be utilized to apply fertilizer to previously planted seeds (e.g., via aligning the row units 22 with the rows of seeds).

As discussed in further detail below, the agricultural implement 10 has foldable wings (e.g., right outer wing 26) each having one or more row units attached. Additionally, the foldable wings may fold to allow the agricultural implement 10 to change the number of row units 22 that engage the ground during operation of the agricultural implement 10 on a field. By enabling the agricultural implement 10 to change the number of row units 22 engaging the field, the agricultural implement 10 may be efficiently operated in fields planted with row planters with various numbers of rows planted. For example, in certain embodiments, the agricultural implement 10 may be used in a field that has been planted with a planter having 16 rows when one or more are placed in a folded position, but the agricultural implement 10 may be suitably used in a field that has been planted with a planter having 24 rows when the wings are deployed in the unfolded position. In other embodiments, the agricultural implement 10 may engage 12, 16, 20, 32, or more row units 22 with the ground when all wings are deployed in the unfolded position, but may engage 4, 8, 12, 16, 24, 28, or more row units 22 with the ground when one or more wings are deployed in the folded position.

By enabling the agricultural implement 10 to operation with variable widths, one model of the agricultural implement 10 may be used on to fertilize a variety of fields. Furthermore, by making one agricultural implement 10 capable of operating in various field types, a versatile embodiment of the agricultural implement 10 enables many users (e.g., an agricultural cooperative program) to purchase one agricultural implement 10 that may be shared between multiple field types within the group even if the fields have various sizes and/or are planted with various planter sizes/types.

Additionally, various embodiments of the agricultural implement 10 may be at least partially disassembled by decoupling one or more wings from another wing/central tool bar 30 for servicing the agricultural implement 10. Furthermore, in certain embodiments, a liquid distribution system may be used to distribute fluid fertilizer to the row units 22 by locating fluid joints at each transition between wings and/or the central tool bar 30 to provide a sealed connection between flexible parts of the distribution system during rotation of one or more wings. Additionally, as discussed below, certain embodiments of the agricultural implement 10 may enable the decoupling of fluid joints for servicing of the agricultural implement by making the fluid joints removable for servicing rather than requiring the decoupling of the distribution system from respective wings and/or central tool bar 30.

Figure 2:
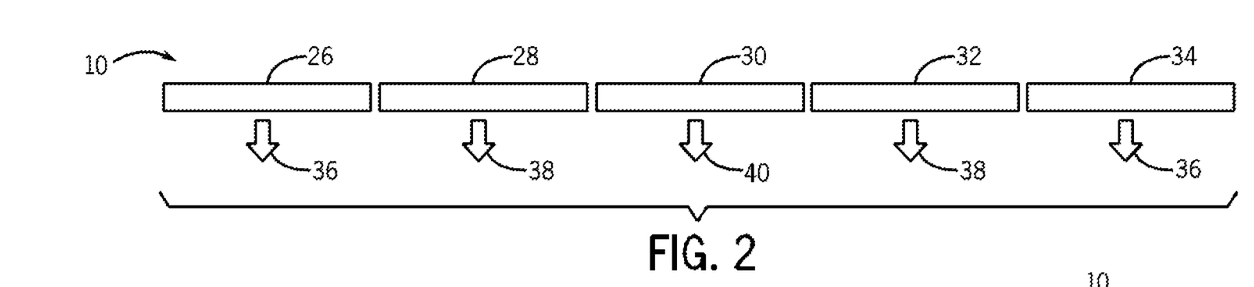
FIG. 2 is a block diagram of the embodiment of the agricultural implement of FIG. 1 having inner and outer wings deployed in a down or unfolded position.

FIG. 2 is a block diagram of the agricultural implement 10 having a right outer wing 26, a right inner wing 28, a central tool bar 30, a left inner wing 32, and a left outer wing 34. In the illustrated embodiment, each of the wings 26, 28, 32, and 34 are each deployed in an unfolded position. Additionally, the agricultural implement 10 may apply an outer wing downward force 36 that urges the right outer wing 26 and the left outer wing 34 towards the soil when the outer wings 26 and 34 are in the unfolded position. Specifically, the downward force 36 urges the row units 22 supported by the outer wings 26 and 34 into the soil at a constant depth when the outer wings 26 and 34 are in the unfolded position. The agricultural implement 10 also may apply an inner wing downward force 38 that urges the inner wings 28 and 32 towards the soil when the inner wings 28 and 32 are in the downward position. Similar to the outer wing downward force 36, the inner wing downward force may urges the row units 22 supported by the inner wings 28 and 32 into the soil at a constant depth during operation of the agricultural implement 10 when the inner wings 28, 30 are in the unfolded position. Furthermore, a central tool bar downward force 40 may be exerted on the central tool bar that urges the central tool bar 30 in a downward direction. Specifically, the central tool bar downward force 40 urges the central tool bar 30 in a downward direction such that row units 22 supported by the central tool bar 30 may engage the soil at a constant depth during operation of the agricultural implement 10 on a field.

In certain embodiments, the outer wing downward force 36, the inner wing downward force 38, and the central tool bar downward force 40 may be substantially similar, or different, resulting from pressure applied to hydraulic actuators. Some embodiments may include outer wing downward forces 36 and inner wing downward forces 38 having equal pressures with the central tool bar downward force 40 having a greater pressure. However, other embodiments may include outer wing downward forces 36, inner wing downward forces 38, and central tool bar downward force 40 each of differing strengths with the central tool bar downward force 40 as the highest magnitude, the inner wing downward force 38 at a lower magnitude, and the outer wing downward force 36 at the lowest magnitude. In other words, such embodiments include downward forces of the bars and wings decrease as the distance from the center of the agricultural implement 10 increases.

In the various embodiments, the downward forces 36, 38, and 40 are configured to urge the central tool bar 26 and the wings 26, 28, 32, and 34 to maintain a constant height above the soil such that the row units 22 attached to the central tool bar 26 and/or the wings 26, 28, 32, and 34 maintain a substantially constant depth during operation of the agricultural implement 10 in a field. Additionally, the downward forces 36, 38, and 40 are each applied to a respective tool bar or wing such that each section of the agricultural implement may have a downward force applied separate from the other sections. As can be appreciated, by applying the downward forces separately to each section rather than applying the downward force to one portion that is mechanically distributed to the other portions, the agricultural implement 10 may maintain a substantially constant depth of agricultural tools attached to each section even when the agricultural implement is operated on uneven terrain. Furthermore, as discussed in further detail below, by having independently applied downward forces 36, 38, and 40, at least one of the downward forces may be applied even if one or more of the wings are deployed in the folded position.

Figure 3:
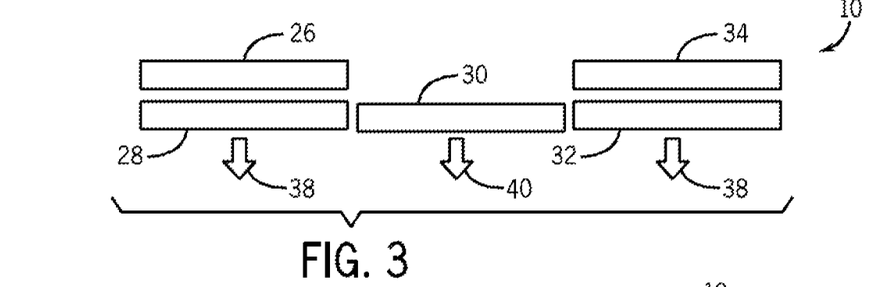
FIG. 3 is a block diagram of the embodiment of the agricultural implement of FIG. 1 having outer wings deployed in an up or folded position and inner wings in a down or unfolded position.

As discussed in detail below, the agricultural implement 10 includes a system for rotating the outer wings 26 and 34 between folded and unfolded positions relative to the inner wings 28 and 32. FIG. 3 is a block diagram of the agricultural implement 10 of FIG. 2 illustrating the right outer wing 26 and the left outer wing 34 deployed in a folded position. As can be appreciated, by rotating the right outer wing 26 relative to the right inner wing 28 and rotating the left outer wing 34 relative to the left inner wing 32, the overall width of the agricultural implement 10 is reduced and thereby reducing the overall number of row units 22 that engage with the soil during operation of the agricultural implement 10 on a field. By including a folding/unfolding system, the agricultural implement 10 may be deployed with outer wings 26 and 34 deployed in unfolded positions as illustrated in FIG. 2 to apply fertilizer to as many rows as possible in a single pass, but the agricultural implement may be operated with the outer wings 26 and 34 in folded positions as illustrated in FIG. 3 in a narrower field and/or in a field planted with a narrower planter to cover less rows per pass of the agricultural implement 10. As previously discussed, the adjustable configurations enable the versatile use of the agricultural implement 10 to be efficiently used in fields of various sizes and/or patterns.

Furthermore, as discussed below, the agricultural implement 10 enables the application of an inner wing downward force 38 and the central tool bar downward force 40 regardless of whether the outer wings 26 and 34 are deployed in folded or unfolded positions. As discussed in greater detail below, even if the outer wing downward forces 36 are enabled when the outer wings 26 and 34 are in respective folded positions, the downward forces 36 may be selected to enable the outer wing downward force 36 to exert a pressure less than a threshold that rotates the outer wings 26 and 34 from respective folded positions into respective unfolded positions.

Figure 4:
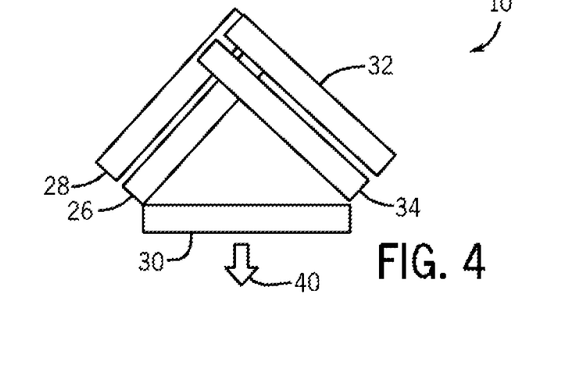
FIG. 4 is a block diagram of the embodiment of the agricultural implement of FIG. 1 having both inner and outer wings deployed in an up or folded position.

As discussed in detail below, the agricultural implement 10 includes a system for rotating the inner wings 28 and 32 between folded and unfolded positions relative to the central tool bar 30. FIG. 4 is a block diagram of the agricultural implement 10 illustrating the wings 26, 28, 32, and 34 in respective folded positions. In certain embodiments, the agricultural implement 10 may be operated in narrower deployment than when the inner wings 28 and 32 are in the unfolded position as illustrated in FIG. 3. When the agricultural implement 10 is operated with the inner wings 28 and 32 in respective unfolded positions, the central tool bar downward force 40 may be enabled to maintain a substantially constant height of the central tool bar 30 and to urge any row units 22 supported by the central tool bar 30 into the soil at a substantially constant depth. Furthermore, in certain embodiments of the agricultural implement 10, even if the outer wing downward force 36 and/or the inner wing downward force 38 are enabled with the inner wings 28 and 32 and/or the outer wings 26 and 34 in the folded positions, the downward forces 36 and 38 are less than the threshold of pressure used to rotate the respective wings into respective unfolded positions. In other words, in such embodiments, the downward forces may be selected such that the enablement of the downward forces 36 and 38 would not alone be sufficient to rotate the wings to unfolded positions from respective folded positions.

Additionally or alternatively, in certain embodiments, the inner wings 28 and 32 may be rotated into respective folded positions to place the agricultural implement 10 into a transport mode that eases travel (e.g., across roads). In such embodiments, the central tool bar downward force 40 (along with the other downward forces) may be disabled and/or reversed to raise the control tool bar 30 in respect to the soil to increase ground clearance such that the likelihood of contact with the earth during transport is reduced. In certain embodiments, the central tool bar 30 and/or wings may be raised before folding the wings to reduce the likelihood of contact between various portions of the agricultural implement 10.

Figure 5:
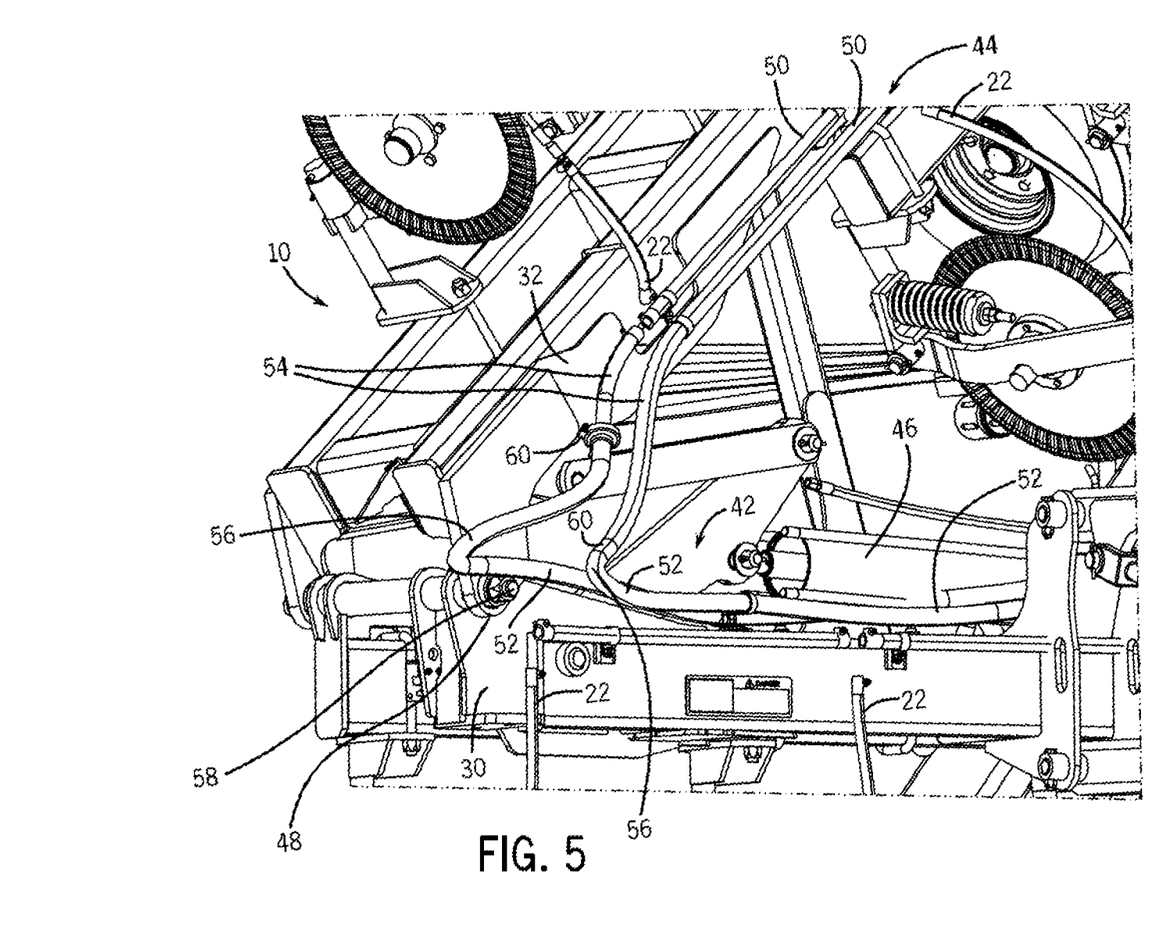
FIG. 5 is a perspective view of an intersection of the outer wing and the inner wing of the agricultural implement of FIG. 1 illustrating hose connections for a fluid supply for the agricultural implement.

FIG. 5 is a perspective view of an intersection 42 of the left inner wing 32 and the central tool bar 30. As previously discussed, fluid fertilizer may be supplied to the row units 22. In certain embodiments, the fluid may be supplied to the row units 22 using a distribution system 44. As illustrated, the intersection 42 includes an actuator cylinder 46 that rotates the left inner wing 32 about a pivot joint 48 relative to the central tool bar 30 to fold and unfold the left inner wing 32 into the positions illustrated in FIGS. 2-4. In certain embodiments, the distribution system 44 may include left inner wing conduits 50 and central tool bar conduits 52. In certain embodiments, the left inner wing conduits 50 and/or the central tool bar conduits 52 may include rigid tubing, hoses, or another suitable conduits for flowing fluid fertilizer under a positive pressure to the row units 22 during operation of the agricultural implement 10. Additionally, in order to enable the rotation of the inner wing 32, each of the left inner wing conduits 50 may include an inner flexible end 54, and each central tool bar conduit 52 may have a central flexible end 56 with the flexible ends configured to maintain a sealed fluid connection when the left inner wing 32 is rotated about the pivot joint 48. In embodiments of the agricultural implement 10 including flexible hoses as respective fluid conduits, the flexible ends may be the included ends of a single flexible hose or may be additional extensions.

Furthermore, in certain embodiments, it may be desirable to decouple one or more of the wings (e.g., outer wings 26 and 34) from the agricultural implement 10 by removing one or more pins 58 from the pivot joint 48 to store, transport, or clean portions of the agricultural implement. For example, it may be desirable to decouple one or more of the wings from the agricultural implement 10 to clean hoses/conduits used on the agricultural implement 10 to remove blockages or other deposits from the inside of the distribution system 44. As discussed below, in order to decouple one or more wings from the agricultural implement, certain embodiments include a fluid joint 60 that provides a sealed connection between the inner flexible ends 54 and respective central flexible ends 52 that allows a disconnection between the inner flexible ends 54 and the central flexible ends 52.

Figure 6:
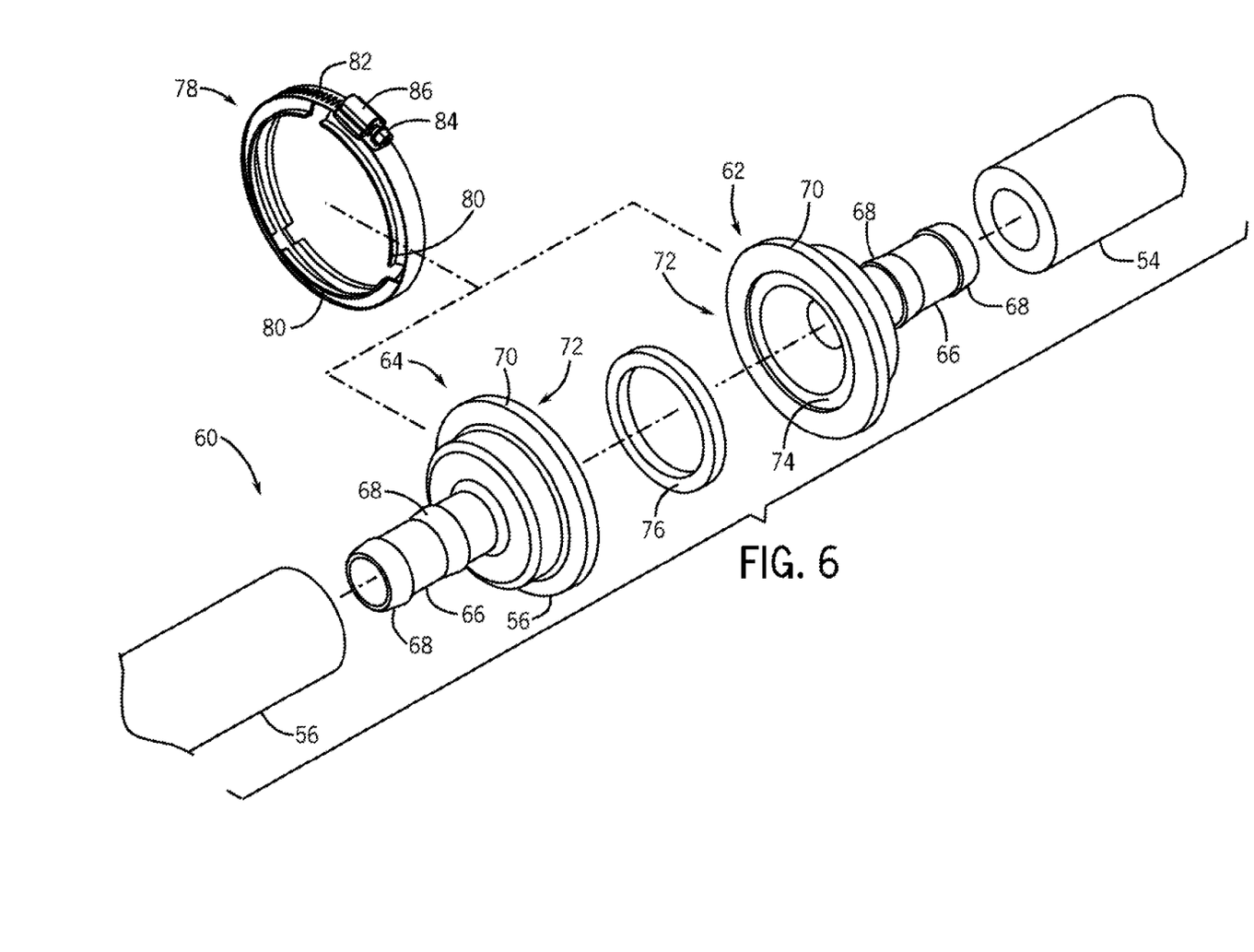
FIG. 6 is a partially exploded view of an exemplary fluid joint for the connections of FIG. 5.

FIG. 6 is a partially exploded view of the fluid joint 60 of FIG. 5. The fluid joint 60 includes a first barbed fitting 62 located within the inner flexible end 54 and a second barbed fitting 64 located within the central flexible end 56. Each of the barbed fittings 62 and 64 include a barbed protrusion 66 that is sized to allow insertion into a respective flexible end of a respective conduit. Additionally, each of the barbed protrusions 66 includes one or more barbs 68 designed to block the protrusions 68 from sliding out of the flexible ends 54 and 56. Each of the barbed fittings 62 and 64 also includes a flange 70 at a mating end 72 of each fitting. In certain embodiments, each barbed fitting 62 and 64 may include a recess 74 that is sized to receive a gasket 76. The gasket 76 may be sized of a width to at least partially fill the recess 74 of each barbed fitting 62 and 64 so that the fluid joint 60 provides a sealed connection between the inner flexible end 54 and the central flexible end 56.

The fluid joint 60 also includes a clamp 78. In certain embodiments, the clamp 78 includes one or more protrusions 80 on each side of the clamp 78 configured to engage with the flanges 70 of each of the barbed fittings 62 and 64. Additionally, the clamp 78 may include a compression device 80. In certain embodiments, the compression device 80 may includes springs, struts, screws, bolts, or other suitable methods for compressing the clamp 78. In the illustrated embodiment, the compression device 80 includes a worm drive system having multiple slots 82 that engage threads of a screw 84. A housing 86 holds the screw 84 in place such that a rotation of the screw 84 urges the clamp 78 to tighten or loosen around the barbed fittings 62 and 64 by using the threads of the screw 84 to move respectively engaged slots 82. Accordingly, once the clamp 78 is placed over the barbed fittings 62 and 64, the clamp 78 may be tightened to couple the barbed fittings 62 and 64 to each other thereby securing the barbed fittings 62 and 64 in relation to each other by clamping the flanges 70 together. Furthermore, the clamp 78 may be loosened to allow disconnection of the barbed fittings 62 and 64 to allow the agricultural implement 10 to be at least partially disassembled for cleaning, transport, storage, and/or servicing.

While the previous discussion discusses an intersection between the left inner wing 32 and the central tool bar 30, similar fluid joints may be located at any joint between the central tool bar 30 and the wings 26, 28, 32, and 34. Accordingly, each fluid joint 60 between the central tool bar 30 and the wings 26, 28, 32, and 34 may be disconnected to enable the agricultural implement 10 to be at least partially disassembled for storage, transport, and/or cleaning without decoupling of the distribution system 44 from each individual wing and/or central tool bar 30.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement comprising:
 a central tool bar supporting central ground engaging tools and central fluid dispersal components;
 a first wing tool bar supporting first wing ground engaging tools and first wing fluid dispersal components, the first wing tool bar being pivotally coupled to the central tool bar at a first end;
 a second wing tool bar supporting second wing ground engaging tools and second wing fluid dispersal components, the second wing tool bar being pivotally coupled to the central tool bar at a second end, wherein the central, the first wing, and the second wing tool bars extend perpendicularly to a direction of travel;
 a central fluid conduit coupled to the central tool bar for conveying fluid to the central fluid dispersal components, the central fluid conduit having a first flexible end adjacent to the first end and a second flexible end at the second end;
 a first wing fluid conduit coupled to the first wing tool bar for conveying fluid to the first wing fluid dispersal components, the first wing fluid conduit having a first wing flexible end adjacent to the first end;
 a second wing fluid conduit coupled to the second wing tool bar for conveying fluid to the second wing fluid dispersal components, the second wing fluid conduit having a second wing flexible end adjacent to the second end;
 a first fluid joint coupled between the first flexible end and the first wing flexible end, wherein the first fluid joint is configured to provide a sealed connection between the first flexible end and the first wing flexible end during relative pivotal movement of the central and first wing tool bars in operation, enable uncoupling of the first flexible end and the first wing flexible end for servicing of the agricultural implement; and a second fluid joint coupled between the second flexible end and the second wing flexible end, wherein the second fluid joint is configured to provide a sealed connection between the second flexible end and the second wing flexible end during relative pivotal movement of the central and second wing tool bars in operation, and to enable uncoupling of the second flexible end and the second wing flexible end for servicing of the agricultural implement;

wherein the first wing tool bar is configured to rotate the first wing ground engaging tools relative to the central ground engaging tools in response to pivotal movement of the first wing tool bar relative to the central tool bar, and the second wing tool bar is configured to rotate the second wing ground engaging tools relative to the central ground engaging tools in response to pivotal movement of the second wing tool bar relative to the central tool bar.

2. The agricultural implement of claim 1, wherein fluid in the central, the first wing, and the second wing fluid conduits are placed under positive pressure during operation for dispersal of the fluid.

3. The agricultural implement of claim 1, wherein the first fluid joint comprises:

a first barbed fitting on the first flexible end; and a second barbed fitting on the first wing flexible end.

4. The agricultural implement of claim 3, wherein the first fluid joint comprises:

a seal disposed between the first and second barbed fittings; and a clamp disposed over mating ends of the first and second barbed fittings.

5. The agriculturally implement of claim 1, wherein the second fluid joint comprises:

a first barbed fitting on the second flexible end;

a second barbed fitting of the second wing flexible end;

a seal disposed between the first and second barbed fittings; and a clamp disposed over mating ends of the first and second barbed fittings.

6. An agricultural implement comprising:

a central tool bar supporting central ground engaging tools and central fluid dispersal components;

a first wing tool bar supporting first wing ground engaging tools and first wing fluid dispersal components, the first wing tool bar being pivotally coupled to the central tool bar at a first end;

a second wing tool bar supporting second wing ground engaging tools and second wing fluid dispersal components, the second wing tool bar being pivotally coupled to the central tool bar at a second end;

a central fluid conduit coupled to the central tool bar for conveying fluid to the central fluid dispersal components, the central fluid conduit having a first flexible end adjacent to the first end and a second flexible end at the second end;

a first wing fluid conduit coupled to the first wing tool bar for conveying fluid to the first wing fluid dispersal components, the first wing fluid conduit having a first wing flexible end adjacent to the first end;

a second wing fluid conduit coupled to the second wing tool bar for conveying fluid to the second wing fluid dispersal components, the second wing fluid conduit having a second wing flexible end adjacent to the second end;

a first fluid joint coupled between the first flexible end and the first wing flexible end, wherein the first fluid joint is configured to provide a sealed connection between the first end and the first wing flexible end during relative pivotal movement of the central and first wing tool bars in operation, and to enable uncoupling of the first flexible end and the first wing flexible end for servicing of the agricultural implement; and a second fluid joint coupled between the second flexible end and the second wing flexible end, wherein the second fluid joint is configured to provide a sealed connection between the second flexible end and the second wing flexible end during relative pivotal movement of the central and second wing tool bars in operation, and to enable uncoupling of the second flexible end and the second wing flexible end for servicing of the agricultural implement;

wherein the first wing tool bar is configured to rotate the first wing ground engaging tools relative to the central ground engaging tools in response to pivotal movement of the first wing tool bar relative to the central tool bar, and the second wing tool bar is configured to rotate the second wing ground engaging tools relative to the central ground engaging tools in response to pivotal movement of the second wing tool bar relative to the central tool bar.

7. The agricultural implement of claim 6, wherein the central fluid conduit comprises a single piece of flexible hose.

8. The agricultural implement of claim 6, wherein the first wing fluid conduit comprises a single piece of flexible hose.

9. The agricultural implement of claim 6, wherein the second wing fluid conduit comprises a single piece of flexible hose.

10. The agricultural implement of claim 6, wherein fluid in the central, first wing, and second wing fluid conduits and the first and second fluid joints are placed under positive pressure during operation for dispersal of the fluid.

11. The agricultural implement of claim 6, wherein the first fluid joint comprises a first barbed fitting on an end of the first flexible end and a first wing barbed fitting on an end of the first wing flexible end, and the second fluid joint comprises a second barbed fitting on an end of the second flexible end and a second wing barbed fitting on an end of the second wing flexible end.

12. The agricultural implement of claim 11, comprising a first seal disposed between the first and first wing barbed fittings, and a second seal disposed between the second and second wing barbed fittings.

13. The agricultural implement of claim 12, wherein the first barbed fitting, the second barbed fitting, first wing barbed fitting, and the second wing barbed fitting each comprise a flange at respective mating ends.

14. The agricultural implement of claim 13, comprising a first clamp disposed over the mating ends of the first and first wing barbed fittings, and a second clamp disposed over the mating ends of the second and second wing barbed fittings.

15. The agricultural implement of claim 14, wherein each clamp comprises a worm drive configured to tighten or loosen the clamp about the mating ends of respective barbed fittings.

16. An agricultural implement comprising:

a main tool bar supporting main ground engaging tools and main fluid dispersal components;

a first wing tool bar supporting first wing ground engaging tools and first wing fluid dispersal components, the first wing tool bar being pivotally coupled to the main tool bar;

a second wing tool bar supporting second wing ground engaging tools and second wing fluid dispersal components, the second wing tool bar being pivotally coupled to the first wing tool bar;

a main fluid conduit coupled to the main tool bar for conveying fluid to the main fluid dispersal components, the main fluid conduit having a main flexible end adjacent to the first wing tool bar;

a first wing fluid conduit coupled to the first wing tool bar for conveying fluid to the first wing fluid dispersal components, the first wing fluid conduit having a first wing flexible end adjacent to main flexible end;

a second wing fluid conduit coupled to the second wing tool bar for conveying fluid to the second wing fluid dispersal components, the second wing fluid conduit having a second wing flexible end adjacent to the first wing flexible end;

a first fluid joint coupled between the main flexible end and the first wing flexible end, wherein the first fluid joint is configured to provide a sealed connection between the main end and the first wing flexible end during relative pivotal movement of the main and first wing tool bars in operation, and to enable uncoupling of the main flexible end and the first wing flexible end for servicing of the agricultural implement; and a second fluid joint coupled between the first and second wing flexible ends, wherein the second fluid joint is configured to provide a sealed connection between the first and the second wing flexible ends during relative pivotal movement of the main and second wing tool bars in operation, and to enable uncoupling of the first and second wing flexible ends for servicing of the agricultural implement;

wherein the main wing tool bar is configured to rotate the first wing ground engaging tools relative to the main ground engaging tools in response to pivotal movement of the first wing tool bar relative to the main tool bar, and the second wing tool bar is configured to rotate the second wing ground engaging tools relative to the main ground engaging tools in response to pivotal movement of the second wing tool bar relative to the main tool bar.

17. The agricultural implement of claim 16, wherein the fluid comprises a fertilizer.

18. The agricultural implement of claim 16, wherein the main ground engaging tools comprise coulter discs, and the main fluid dispersal components comprise dispersal blades or fluid injectors.

19. The agricultural implement of claim 16, wherein the first wing ground engaging tools comprise coulter discs, and the first wing fluid dispersal components comprise dispersal blades or fluid injectors.

20. The agricultural implement of claim 16, wherein the second wing ground engaging tools comprise coulter discs, and the second wing fluid dispersal components comprise dispersal blades or fluid injectors.

* * * * *